Jan. 16, 1968   W. D. CROW   3,363,435
DYNAMO-ELECTRIC MACHINES
Filed Dec. 27, 1965
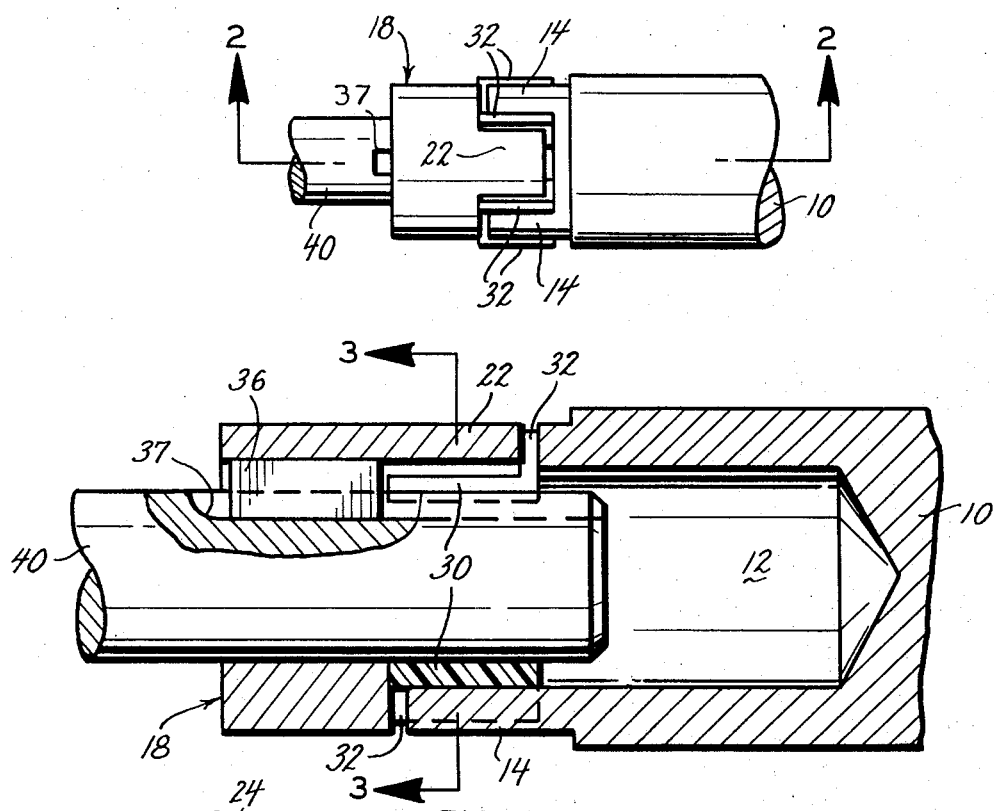
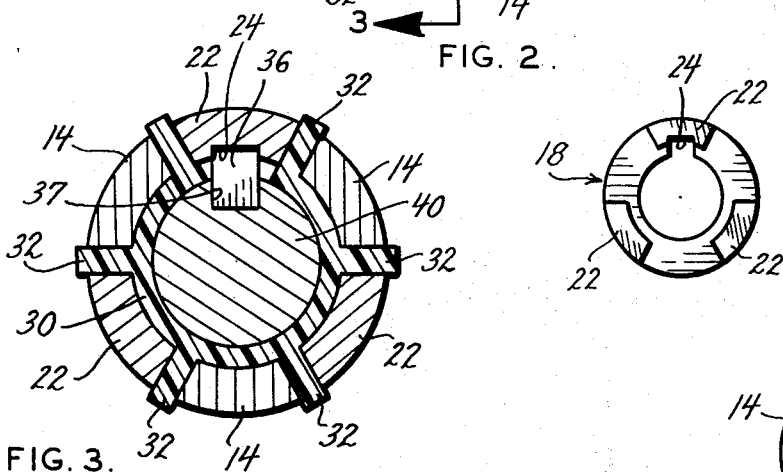
FIG. 3.
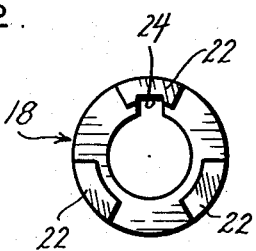
FIG. 5.
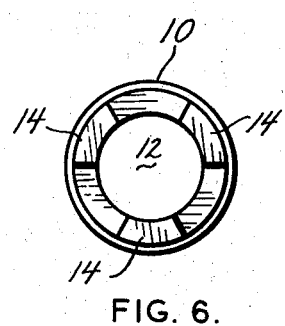
FIG. 6.
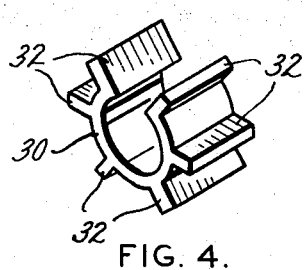
FIG. 4.

United States Patent Office 3,363,435
Patented Jan. 16, 1968

3,363,435
DYNAMO-ELECTRIC MACHINES
William D. Crow, St. Louis County, Mo., assignor to Century Electric Company, St. Louis, Mo., a corporation of Missouri
Filed Dec. 27, 1965, Ser. No. 516,423
8 Claims. (Cl. 64—27)

ABSTRACT OF THE DISCLOSURE

A coupling for two axially-aligned shafts includes spaced projections formed directly on the end of one of those shafts, includes a socket in that end of that one shaft which is large enough to accommodate one end of the other of those shafts, includes a member which is mounted on or inwardly of that end of that other shaft and which has spaced projections alternated with the spaced projections on the end the one shaft, and includes a generally annular plastic element which has generally flat projections that extend radially-outwardly and that lie between and isolate the confronting side edges of the alternated projections on the end of the one shaft and on the member.

---

This invention relates to improvements in dynamo-electric machines. More particularly, this invention relates to improvement in couplings which can connect the shafts of dynamo-electric machines to the shafts of devices to be driven by those dynamo-electric machines.

It is, therefore, an object of the present invention to provide an improved coupling which can connect the shaft of a dynamo-electric machine to the shaft of a device to be driven by that dynamo-electric machine.

It is frequently desirable to connect the shaft of a dynamo-electric machine, to the shaft of a device to be driven by that dynamo-electric machine, by means of a coupling which will accommodate small angular displacements between the axes of those shafts. In recognition of that fact, couplings have been proposed which could be used to connect the shafts of dynamo-electric machines to the shafts of devices to be driven by those dynamo-electric machines. However, some of those couplings were complicated in nature and were thus unduly expensive; and other of those couplings were bulky and occupied undue amounts of space. It would be desirable to provide a coupling which could connect the shaft of a dynamo-electric machine to the shaft of a device to be driven by that dynamo-electric machine and which would be inexpensive and compact. The present invention provides such a coupling; and it does so by forming part of that coupling directly on the end of the shaft of the device to be driven by the dynamo-electric machine, by providing a socket in the end of that shaft which is large enough to accommodate part of one end of the shaft of the dynamo-electric machine, and by forming another part of the coupling so it can bodily telescope over that one end of the shaft of the dynamo-electric machine. By forming part of the coupling directly on the end of the shaft of the device to be driven by the dynamo-electric machine, the present invention obviates the time and cost which would be required to assemble a part of a coupling with the shaft of the device to be driven by the dynamo-electric machine. By forming a large socket in the end of the shaft of the device to be driven by the dynamo-electric machine, the present invention compensates for any variation in the lengths of the shafts of the dynamo-electric machine and of the device to be driven by that dynamo-electric machine, and also compensates for variations in the axial positions of those shafts. By having another part of the coupling bodily telescope over one end of the shaft of the dynamo-electric machine, the present invention conserves space and thus helps make the coupling compact. It is, therefore, an object of the present invention to provide a coupling which can connect the shaft of a dynamo-electric machine to the shaft of a device to be driven by that dynamo-electric machine and which has a portion thereof formed on the end of the shaft of the device to be driven by that dynamo-electric machine, which has a large socket in the end of that shaft to accommodate one end of the shaft of the dynamo-electric machine, and which has another part thereof bodily telescoped over the one end of the shaft of the dynamo-electric machine.

The coupling provided by the present invention operates with a minimum of noise and with a minimum of frictional forces between the shaft of the dynamo-electric machine and the shaft of the device to be driven by that dynamo-electric machine. Specifically, the coupling provided by the present invention has a generally annular intermediate member of smooth-surfaced plastic material which is interposed between rigid sections of that coupling and which will transmit power between those sections. The smooth surfaces of that generally annular intermediate element minimize the frictional forces between that generally annular intermediate element and the rigid sections of the coupling; and hence any relative movement which must occur between those rigid sections and that generally annular intermediate insert can occur with a minimum of frictional resistance. Furthermore, that generally annular intermediate insert prevents direct engagement between the rigid sections of the coupling, and thus obviates the noise which such a direct engagement would produce. It is, therefore, an object of the present invention to provide a generally annular intermediate member of smooth-surfaced plastic material which is interposed between two rigid sections of a coupling and which will prevent direct engagement between those sections of that coupling.

The generally annular intermediate insert of the coupling provided by the present invention has an angular extent of less than three hundred and sixty degrees; and this is important because it permits a keyway to be formed in the shaft of the dynamo-electric machine and in one of the rigid sections of that coupling. Such keyways enable the said one rigid section of the coupling and the shaft of the dynamo-electric machine to be positively locked against relative rotation by a key; and hence any and all slipping of the one rigid section of the coupling relative to the shaft of the dynamo electric machine is completely obviated. Moreover, because the other rigid section of the coupling is formed directly on the end of the shaft of the device to be driven by the dynamo-electric machine, there can be no slipping between that section of the coupling and the shaft of the device to be driven by the dynamo-electric machine. In addition, because the generally annular intermediate insert of the coupling is snugly disposed between the two rigid sections of the coupling, there can be no appreciable slipping between those sections of the coupling. The overall result is that the coupling provided by the present invention can substantially obviate any and all slipping between the shaft of the dynamo-electric machine and the shaft of the device to be driven by that dynamo-electric machine.

Other and further objects and advantages of the present invention should become apparent from an examination of the drawing and accompanying description.

In the drawing and accompanying description a preferred embodiment of the present invention is shown and described but it is to be understood that the drawing and accompanying description are from the purpose of illustration only and do not limit the invention and that the invention will be defined by the appended claims.

In the drawing, FIG. 1 is a plan view of one preferred embodiment of coupling that is made in accordance with the principles and teachings of the present invention, FIG. 2 is a partially broken-away, sectional view, on a larger scale, through the coupling of FIG. 1, and it is taken along the plane indicated by the line 2—2 in FIG. 1, FIG. 3 is a sectional view, on the scale of FIG. 2, through the generally annular intermediate insert of the coupling of FIG. 1, and it is taken along the plane indicated by the line 3—3 in FIG. 2, FIG. 4 is a perspective view of the generally annular intermediate insert of the coupling of FIG. 1, FIG. 5 is an end elevational view, on the scale of FIG. 1, of the rigid section of the coupling which will be telescoped over the shaft of the dynamo-electric machine, and FIG. 6 is an end elevational view, on the scale of FIG. 1, of the rigid section of the coupling which is formed on the shaft of the device to be driven by the dynamo-electric machine.

Referring to the drawing in detail, the numeral 10 denotes the shaft of a device to be driven by a dynamo-electric machine. That device could be one of a considerable number of devices; and one particularly suitable device is a speed-reducing gear train. A large socket 12 is formed in the left-hand end of the shaft 10; and three projections 14 extend to the left from that left-hand end. Those projections are arcuate in end elevation, and the side edges of those projections are defined by radially-extending planes. The left-hand end of the shaft 10 constitutes one rigid section of the coupling that is provided by the present invention.

The other rigid section of the coupling provided by the present invention is generally denoted by the numeral 18, and that section is annular in configuration. Three projections 22 are formed on the right-hand end of that rigid section; and those projections are arcuate in end elevation. The side edges of those projections are defined by radially-extending planes.

The projections 22 are dimensioned to have approximately the same inner radii and the same outer radii as the projections 14 on the left-hand end of the shaft 10. Further, the angular extents of the projections 22 are smaller than the angular extents of the spaces between the projections 14 on the left-hand end of the shaft 10. As a result, the projections 22 on the rigid section 18 of the coupling can telescope into the spaces between, and can thus alternate with, the projections 14 on the left-hand end of the shaft 10. A keyway 24 is formed in the inner surface of the section 18 of the coupling; and that keyway is in register with, and extends into, one of the projections 22 on that rigid section.

The numeral 30 denotes a generally annular intermediate insert of the coupling provided by the present invention; and that generally annular intermediate insert is made from a plastic material which is rugged and tough and which has smooth surfaces. One plastic material which has been found to be particularly suitable for use in making the generally annular intermediate insert 30 is polyurethane. The generally annular intermediate insert 30 has an angular extent of about three hundred degrees; and hence it is not complete annulus. This is important because it enables a key 36 to be mounted in the keyway 24 of the rigid section 18 of the coupling and in a keyway 37 in the end of the shaft 40 of a dynamo-electric machine. The key 36 will coact with the keyway 37 in the shaft 40 and with the keyway 24 in the rigid section 18 of the coupling 18 to substantially prevent any shifting of that rigid section relative to that shaft.

The generally annular intermediate insert 30 is dimensioned to fit snugly within the space defined by the projections 14 on the end of the shaft 10, and also to fit snugly within the space defined by the projections 22 on the rigid section 18 of the coupling. The inner diameter of that generally annular insert is large enough to permit the end of the shaft 40 to telescope through it. Radially-directed projections 32 are formed at the outer surface of the generally annular intermediate insert 30; and those projections extend into the spaces between the side edges of the projections 22 on the rigid section 18 of the coupling and the side edges of the projections 14 on the left-hand end of the shaft 10. The projections 32 on the generally annular intermediate insert 30 are dimensioned to fit snugly between the side edges of the alternated projections 14 and 22, so substantially no "play" exists between the rigid sections of the coupling.

It will be noted that the radially-directed projections 32 on the generally annular intermediate insert 30 are longer than the projections 14 and also are longer than the projections 22 on the rigid section 18. This is important; because it enables that generally annular intermediate insert to keep the projections 14 from contacting the spaces in the rigid section 18 between the projections 22, and also enables that generally annular intermediate insert to keep the projections 22 from contacting the spaces in the end of the shaft 10 between the projections 14. In this way, the generally annular intermediate insert 30 prevents any direct engagement between the rigid section 18 of the coupling and the rigid section of the coupling constituted by the left-hand end of the shaft 10. As a result, that generally annular intermediate insert minimizes the noise developed in the coupling as the shafts 10 and 40 rotate. Further, because the material of which the generally annular intermediate insert 30 is formed has smooth surfaces, there will be a minimum of frictional forces developed in the coupling.

It will be noted that the inner diameter of the socket 12 in the left-hand end of the shaft 10 is larger than the diameter of the right-hand end of the shaft 40 of the dynamo-electric machine. This enables the latter shaft to extend into the socket 12; and this is desirable because it fully compensates for any variations in the lengths of the shafts 10 and 40, and it also compensates for adjustments in the axial positions of those shafts. Further, it will be noted that the rigid section 18 of the coupling wholly telescopes over the right-hand end of the shaft 40 of the dynamo-electric machine.

It will also be noted that the projections 32 of the generally annular intermediate insert 30 provide full bearing areas for the side faces of the alternated projections 14 and 22 of the rigid sections of the coupling. Because the projections 32 of the generally annular intermediate insert 30 are disposed directly between the alternated projections 14 and 22 of the rigid sections of the coupling, those projections will be predominately subjected to compressive rather than to bending or shear forces. The material of which that generally annular intermediate insert is made is well adapted to withstand compressive forces; and hence the coupling provided by the present invention can withstand high unit pressure loading.

It will also be noted that the coupling provided by the present invention enables the shaft 10 of the driven device to be fully and completely supported by bearings within the housing for that device. Also, that coupling enables the shaft 40 of the dynamo-electric machine to be fully and wholly supported by bearings within the housing of that dynamo-electric machine. As a result, both the shaft 10 and the shaft 40 can be held for precisely concentric rotation; and this will minimize the wearing of the bearings which support those shafts. Furthermore, this will minimize the noise generated by those bearings as those shafts rotate. Further, where the device of which the shaft 10 is a part has gears, the fact that the shaft 10 is fully and wholly supported by bearings within the housing of that device will minimize the noise created by, and the wearing of, those gears.

Whereas the drawing and accompanying description have shown and described a preferred embodiment of the present invention it should be apparent to those skilled in the art that various changes may be made in the form of the invention without affecting the scope thereof.

What I claim is:

1. A coupling that comprises:
   (a) a rotatable shaft which has a socket in one end thereof,
   (b) spaced projections that are rotatable with said rotatable shaft and that are disposed radially outwardly of said socket to provide full access to said socket,
   (c) a member that can be telescoped onto one end of a second rotatable shaft which is disposed in end-to-end relation with the first said rotatable shaft,
   (d) said one end of said second rotatable shaft being dimensioned to telescope into said socket in said one end of the first said rotatable shaft,
   (e) said member having spaced projections thereon,
   (f) said member being securable to and rotatable with said second rotatable shaft,
   (g) said spaced projections that are rotatable with the first said rotatable shaft having angular extents which are smaller than the angular extents of the spaces between said projections on said member,
   (h) said spaced projections that are rotatable with the first said rotatable shaft alternating with said projections on said member,
   (i) said projections that are rotatable with the first said rotatable shaft having side edges that are coextensive in part with the side edges of said projections on said member,
   (j) the alternated projections, that are rotatable with the first said rotatable shaft and that are on said member, generally defining a cylindrical space, and
   (k) a generally annular element that is disposed within said cylindrical space and that has projections which extend outwardly to lie between said side edges of said projections that are rotatable with the first said rotatable shaft and that are on said member,
   (l) said generally annular element being dimensioned to permit said one end of said second rotatable shaft to telescope through it and into said socket in said one end of the first said rotatable shaft,
   (m) said projections on said generally annular element being coextensive in part with said side edges of said projections that are rotatable with the first said rotatable shaft and that are on said member,
   (n) said side edges of said projections that are rotatable with the first said rotatable shaft and that are on said member being generally flat, and said projections on said generally annular element having side edges that are generally flat,
   (o) said projections on said generally annular element being dimensioned to fit snugly between said side edges of said projections that are rotatable with the first said rotatable shaft and that are on said member, so substantially no "play" exists between the first said rotatable shaft and said member.

2. A coupling that comprises:
   (a) a member which has a plurality of spaced projections at one face thereof,
   (b) a second member that can be telescoped onto one end of a rotatable shaft,
   (c) said second member having spaced projections at one face thereof,
   (d) said second member being securable to and rotatable with said rotatable shaft,
   (e) said spaced projections at said one face of the first said member having angular extents which are smaller than the angular extents of the spaces between said projections at said one face of said second member,
   (f) said spaced projections at said one face of the first said member alternating with said spaced projections at said one face of said second member,
   (g) said spaced projections at said one face of the first said member having side edges that are coextensive in part with the side edges of said spaced projections at said one face of said second member generally defining a cylindrical space,
   (h) the alternated projections at said one face of the first said member and at said one face of said second member generally defining a cylindrical space,
   (i) a generally annular element that is disposed within said cylindrical space and that has projections which extend outwardly to lie between said side edges of said projections at said one face of the first said member and at said one face of said second member,
   (j) the spaced projections on said generally annular element being coextensive in part with said side edges of said projections at said one face of the first said member and at said one face of said second member to transmit forces between said projections,
   (k) said generally annular element having an angular extent of less than three hundred and sixty degree to provide a gap intermediate the ends thereof, and
   (l) securing means that can fixedly secure said second member to said rotatable shaft,
   (m) said securing means being disposed within said gap between said ends of said generally annular element.

3. A coupling that comprises:
   (a) a rotatable shaft which has a socket in one end thereof,
   (b) spaced projections that are rotatable with said rotatable shaft and that are disposed radially outwardly of said socket,
   (c) a member that can be telescoped onto one end of a second rotatable shaft which is disposed in end-to-end relation with the first said rotatable shaft,
   (d) said one end of said second rotatable shaft being dimensioned to telescope into said socket in said one end of the first said rotatable shaft,
   (e) said member having spaced projections thereon,
   (f) said member being securable to and rotatable with said second rotatable shaft,
   (g) said spaced projections that are rotatable with the first said rotatable shaft having angular extents which are smaller than the angular extents of the spaces between said projections on said member,
   (h) said spaced projections that are rotatable with the first said rotatable shaft alternating with said projections on said member,
   (i) the alternated projections, that are rotatable with the first said rotatable shaft and that are on said member, generally defining a cylindrical space, and
   (j) a generally annular element that is disposed within said cylindrical space and that has projections which extend outwardly to lie between said side edges of said projections that are rotatable with the first said rotatable shaft and that are on said member,
   (k) said generally annular element being dimensioned to permit said one end of said second rotatable shaft to telescope through it,
   (l) said projections on said generally annular element being coextensive in part with said side edges of said projections that are rotatable with the first said rotatable shaft and that are on said member,
   (m) said projections that are rotatable with the first said rotatable shaft being integral with the first said rotatable shaft,
   (n) said socket in said one end of the first said rotatable shaft compensating for variations in the lengths of the first said and said second rotatable shafts and also compensating for variations in the axial positions of the first said and said second rotatable shafts,
   (o) said projections on said generally annular member being substantially coextensive in area with said side edges of said projections that are rotatable with the first said rotatable shaft and being substantially coextensive in area with said side edges of said projections that are on said member, whereby substantially the full areas of said side edges of said projections that are rotatable with the first said rotatable shaft and substantially the full areas of said side edges of said projections that are on said member can transmit rotative forces.

4. A coupling that comprises:
(a) a rotatable shaft that has a socket therein that extends inwardly from one end of said rotatable shaft,
(b) said socket having the geometric axis of said rotatable shaft extending through it,
(c) spaced projections that are integral with said rotatable shaft, that are disposed radially outwardly of said socket, that are axially-directed, and that extend axially beyond said one end of said rotatable shaft,
(d) a second rotatable shaft that has a diameter at one end thereof which is appreciably smaller than the diameter of said socket so said one end of said second rotatable shaft can be telescoped into said socket without engaging the walls of said socket,
(e) said second shaft being mounted in end-to-end relation with the first said rotatable shaft,
(f) the reduced diameter of said one end of said second rotatable shaft enabling said one end of said second rotatable shaft to be disposed within said socket and enabling the geometric axis of said second rotatable shaft to be disposed at a slight angle to said geometric axis of said first said rotatable shaft without causing said one end of said second rotatable shaft to engage the walls of said socket,
(g) a member telescoped onto said second rotatable shaft,
(h) said member having spaced projections thereon,
(i) said member being secured to and rotatable with said second rotatable shaft,
(j) said spaced projections that are integral with said first said rotatable shaft having angular extents which are smaller than the angular extents of the spaces between said spaced projections on said member,
(k) said spaced projections on said member being axially-directed of said member and of said second rotatable shaft,
(l) said spaced projections that are integral with said first said rotatable shaft alternating with said spaced projections on said member,
(m) said spaced projections that are integral with said first said rotatable shaft having side edges that are co-extensive in part with the side edges of said spaced projections on said member, and
(n) a generally-annular element that is disposed adjacent said member and that has projections thereon which lie between said side edges of said spaced projections that are integral with said first said rotatable shaft and said side edges of said spaced projections on said member,
(o) said generally-annular element being dimensioned so said one end of said second rotatable shaft can extend through said member and through said generally-annular element into said socket in said one end of said first said rotatable shaft,
(p) said generally-annular element being made of nonmetallic material which is rugged and tough,
(q) said projections on said generally-annular element being dimensioned to fit between said side edges of said spaced projections that are unitary with said first said rotatable shaft and said side edges of said spaced projections that are on said member, and to transmit rotative forces between said spaced projections while permitting said spaced projections to slide relative to each other in response to any angular displacement between said geometric axes of said rotatable shafts,
(r) said projections on said generally-annular element being thin, thereby enabling the angular extents of said spaced projections that are unitary with said first said rotatable shaft and the angular extents of said spaced projections on said member to constitute the major portion of the angular extent of said coupling,
(s) said socket in said one end of said first said shaft accommodating those portions of said one end of said second shaft which extend completely through said member and through said generally-annular element to permit close positioning of said rotatable shafts.

5. A coupling that comprises:
(a) a rotatable shaft which has a socket in one end thereof,
(b) spaced projections that are rotatable with said rotatable shaft and that are disposed radially outwardly of said socket,
(c) a member that can be telescoped onto one end of a second rotatable shaft which is disposed in end-to-end relation with the first said rotatable shaft,
(d) said one end of said second rotatable shaft being dimensioned to telescope into said socket in said one end of the first said rotatable shaft,
(e) said member having spaced projections thereon,
(f) said member being securable to and rotatable with said second rotatable shaft,
(g) said spaced projections that are rotatable with the first said rotatable shaft having angular extents which are smaller than the angular extents of the spaces between said projections on said member,
(h) said spaced projections that are rotatable with the first said rotatable shaft alternating with said projections on said member,
(i) said projections that are rotatable with the first said rotatable shaft having side edges that are coextensive in part with the side edges of said projections on said member,
(j) the alternated projections, that are rotatable with the first said rotatable shaft and that are on said member, generally defining a cylindrical space, and
(k) a generally annular element that is disposed within said cylindrical space and that has projections which extend outwardly to lie between said side edges of said projections that are rotatable with the first said rotatable shaft and that are on said member,
(l) said generally annular element being dimensioned to permit said one end of said second rotatable shaft to telescope through it,
(m) said projections on said generally annular element being coextensive in part with said side edges of said projections that are rotatable with the first said rotatable shaft and that are on said member,
(n) said generally annular element having an angular extent of less than three hundred and sixty degrees,
(o) said member having a keyway therein,
(p) said second rotatable shaft having a keyway therein,
(q) said generally annular element having the open portion thereof in register with said keyways to permit a key to be disposed within said keyways.

6. A coupling that comprises:
(a) a member which has a plurality of spaced projections at one face thereof,
(b) a second member that can be telescoped onto one end of a rotatable shaft,
(c) said second member having spaced projections at one face thereof,
(d) said second member being securable to and rotatable with said rotatable shaft,
(e) said spaced projections at said one face of the first said member having angular extents which are smaller than the angular extents of the spaces between said projections at said one face of said second member,
(f) said spaced projections at said one face of the first said member alternating with said spaced projections at said one face of said second member,
(g) said spaced projections at said one face of the first said member having side edges that are coextensive in part with the side edges of said spaced projections at said one face of said second member,
(h) the alternated projections at said one face of the first said member and at said one face of said second member generally defining a cylindrical space,
(i) a generally annular element that is disposed within said cylindrical space and that has projections which extend outwardly to lie between said side edges of said projections at said one face of the first said member and at said one face of said second member,
(j) the spaced projections on said generally annular element being coextensive in part with said side edges of said projections at said one face of the first said member and at said one face of said second member to transmit forces between said projections;
(k) said generally annular element having an angular extent of less than three hundred and sixty degrees to provide a gap intermediate the ends thereof, and
(l) securing means that can fixedly secure said second member to said rotatable shaft,
(m) said securing means being disposed within said gap between said ends of said generally annular element,
(n) said securing means being a key,
(o) said second member having a keyway that snugly accommodates said key,
(p) said rotatable shaft also having a keyway that snugly accommodates said key.

7. A coupling that comprises:
(a) a member which has a plurality of spaced projections at one face thereof,
(b) a second member that can be telescoped onto one end of a rotatable shaft,
(c) said second member having spaced projections at one face thereof,
(d) said second member being securable to and rotatable with said rotatable shaft,
(e) said spaced projections at said one face of the first said member having angular extents which are smaller than the angular extents of the spaces between said projections at said one face of said second member,
(f) said spaced projections at said one face of the first said member alternating with said spaced projections at said one face of said second member,
(g) said spaced projections at said one face of the first said member having side edges that are coextensive in part with the side edges of said spaced projections at said one face of said second member,
(h) the alternated projections at said one face of the first said member and at said one face of said second member generally defining a cylindrical space,
(i) a generally annular element that is disposed within said cylindrical space and that has projections which extend outwardly to lie between said side edges of said projections at said one face of the first said member and at said one face of said second member,
(j) the spaced projections on said generally annular element being coextensive in part with said side edges of said projections at said one face of the first said member and at said one face of said second member to transmit forces between said projections,
(k) said generally annular element having an angular extent of less than three hundred and sixty degrees to provide a gap intermediate the ends thereof, and
(l) securing means that can fixedly secure said second member to said rotatable shaft,
(m) said securing means being disposed within said gap between said ends of said generally annular element,
(n) said projections on said generally annular element having axial extents greater than the axial extents of said spaced projections at said one face of the first said member and greater than the axial extents of said spaced projections at said one face of said second member,
(o) whereby said projections on said generally annular element will prevent direct contact between the first said and said second members.

8. A coupling that comprises:
(a) a member which has a plurality of spaced projections at one face thereof,
(b) a second member that can be telescoped onto one end of a rotatable shaft,
(c) said second member having spaced projections at one face thereof,
(d) said second member being securable to and rotatable with said rotatable shaft,
(e) said spaced projections at said one face of the first said member having angular extents which are smaller than the angular extents of the spaces between said projections at said one face of said second member,
(f) said spaced projections at said one face of the first said member alternating with said spaced projections at said one face of said second member,
(g) said spaced projections at said one face of the first said member having side edges that are coextensive in part with the side edges of said spaced projections at said one face of said second member,
(h) the alternated projections at said one face of the first said member and at said one face of said second member generally defining a cylindrical space,
(i) a generally annular element that is disposed within said cylindrical space and that has projections which extend outwardly to lie between said side edges of said projections at said one face of the first said member and at said one face of said second member,
(j) the spaced projections on said generally annular element being coextennive in part with said side edges of said projections at said one face of the first said member and at said one face of said second member to transmit forces between said projections,
(k) said generally annular element having an angular extent of less than three hundred and sixty degrees to provide a gap intermediate the ends thereof, and
(l) securing means that can fixedly secure said second member to said rotatable shaft,
(m) said securing means being disposed within said gap between said ends of said generally annular element,
(n) said first said member being a rotatable shaft,
(o) said spaced projections at said one face of said first said member extending axially of said first said member,
(p) said spaced projections at said one face of said second member extending axially of said second member.

References Cited
UNITED STATES PATENTS

| | | | |
|---|---|---|---|
| 1,605,925 | 10/1926 | MacDonald | 64—13 |
| 2,620,640 | 12/1952 | Bales | 64—27 X |
| 2,706,897 | 4/1955 | Holoye | 64—14 |
| 2,891,395 | 6/1959 | Charter | 64—14 |
| 2,902,842 | 9/1959 | Byrom | 64—14 |
| 2,996,900 | 8/1961 | Fermier | 64—27 X |

FRED C. MATTERN, Jr., *Primary Examiner.*

HALL C. COE, *Examiner.*